US008574383B2

(12) United States Patent
Casey et al.

(10) Patent No.: US 8,574,383 B2
(45) Date of Patent: Nov. 5, 2013

(54) METHOD AND APPARATUS FOR DETERMINING BLOWOUT IN A CORRUGATION

(75) Inventors: David W. Casey, Salisbury, NC (US); Gregg A. Bryan, Mooresville, NC (US); Karl U. Wuerminghausen, Canton, OH (US)

(73) Assignee: Greif Packaging LLC, Delaware, OH (US)

( * ) Notice: Subject to any disclaimer, the term of this patent is extended or adjusted under 35 U.S.C. 154(b) by 224 days.

(21) Appl. No.: 12/944,313

(22) Filed: Nov. 11, 2010

(65) Prior Publication Data

US 2012/0118474 A1 May 17, 2012

(51) Int. Cl.
*B29C 41/00* (2006.01)

(52) U.S. Cl.
USPC .............. 156/64; 156/205; 156/206; 156/210

(58) Field of Classification Search
USPC ........... 156/64, 205, 206, 210, 350, 351, 352, 156/360, 363
See application file for complete search history.

(56) References Cited

U.S. PATENT DOCUMENTS

| | | | | |
|---|---|---|---|---|
| 6,174,413 | B1 * | 1/2001 | Ruf et al. | 162/259 |
| 2003/0084985 | A1 * | 5/2003 | Iren | 156/210 |
| 2007/0137788 | A1 * | 6/2007 | Loffler et al. | 156/324 |
| 2010/0163154 | A1 * | 7/2010 | Masuda | 156/64 |

* cited by examiner

*Primary Examiner* — Christopher Schatz

(74) *Attorney, Agent, or Firm* — Sand & Sebolt

(57) ABSTRACT

A corrugator includes a separation sensor for sensing separation of a corrugated medium and liner of a corrugated paperboard. Sensing the separation, also known as blowout or fluff out, allows the corrugator to be controlled to prevent problems which arise when corrugated paperboard having such a separation continues downstream along the corrugator. Typically, the corrugator is operated to cease downstream movement of the paperboard while a faulty segment which includes the separation is removed and the problem causing the separation is fixed, thereby providing for subsequent production of corrugated paperboard which is properly glued.

18 Claims, 7 Drawing Sheets

METHOD AND APPARATUS FOR DETERMINING BLOWOUT IN A CORRUGATION

BACKGROUND OF THE INVENTION

1. Technical Field

The present invention relates to a corrugator or corrugating machine and a method of operating the machine for making corrugated paperboard. More particularly, the present invention relates to a corrugator having a separation sensor which is used to sense separation of layers of the paperboard which have been glued together.

2. Background Information

Corrugators for making corrugated paperboard are well known, and are sometimes referred to as corrugating machines or corrugating lines which include a series of linked machines. Corrugated paperboard or corrugated board has a number of common uses, including the formation of corrugated boxes, mainly used for shipping and storage. Corrugated paperboard is typically made from rolls of liner or paperboard which are typically large rolls of wound paper which may stretch out over several miles when unwound. Corrugated paperboard is formed of wavy or fluted paper known as a corrugating or corrugated medium which is glued to a flat sheet typically called a liner. Corrugated board can thus be made up of one or more layers of the corrugated medium and one or more of the liners. For instance, a single liner glued to corrugated medium creates a singleface corrugated board. Corrugated medium glued between two flat liners forms a single wall corrugated board. The addition of another corrugated medium and third flat liner to the single wall corrugated board creates a double wall corrugated board. Triple wall corrugated boards may also be formed with three layers of corrugated medium and four flat liners glued to one another in a similar alternating configuration.

Corrugators operate such that the paperboard, liners or webs unwind rapidly off of wound rolls and move downstream typically at a rate of 500 lineal feet per minute or more. This rate is often up to or in excess of 1,000 feet per minute. During the formation process, one of the liners typically passes between two corrugating rolls which form the liner into the corrugated medium, which is subsequently glued to the other liner in order to form the singleface web noted above, which is a continuous sheet of flat paper with fluted paper or the corrugating medium glued to it. Before the liners reach the corrugating rolls and before being glued together, they are typically heated by heating rolls and exposed to steam applicators or showers. Glue is then typically applied to tips of the flutes of the corrugated medium in order to glue the corrugated medium to the flat liner to form the corrugated paperboard.

One of the problems that arises in the formation of the corrugated paperboard is the separation of the corrugated medium from the liner after it has been glued together. Such a separation can cause substantial problems at certain locations downstream of the gluing or joining of the liner and corrugated medium. Thus, it would be highly beneficial in order to ascertain the separation between the layers of paperboard relatively shortly downstream of the gluing station in order to prevent these problems further downstream. The present invention achieves this goal.

BRIEF SUMMARY OF THE INVENTION

The present invention provides a method comprising the steps of gluing a corrugated medium to a liner as the medium and liner are moving downstream through a corrugator to form a corrugated paperboard; and sensing with a separation sensor a separation of the glued medium and liner from one another.

The present invention also provides a corrugator comprising a plurality of rotatable rolls adapted to guide downstream movement of a corrugated medium and a liner; a glue applicator adapted to glue the medium to the liner as the medium and liner are moving downstream to form a corrugated paperboard; and a separation sensor which is downstream of the glue applicator and adapted to sense a separation of the medium from the liner.

The present invention further provides a combination comprising a corrugated paperboard comprising a corrugated medium glued to a liner; a paperboard conveyor system which during operation conveys the corrugated paperboard in a downstream direction; and a separation sensor positioned to sense a separation of the medium from the liner during downstream movement of the corrugated paperboard.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Figure 1:
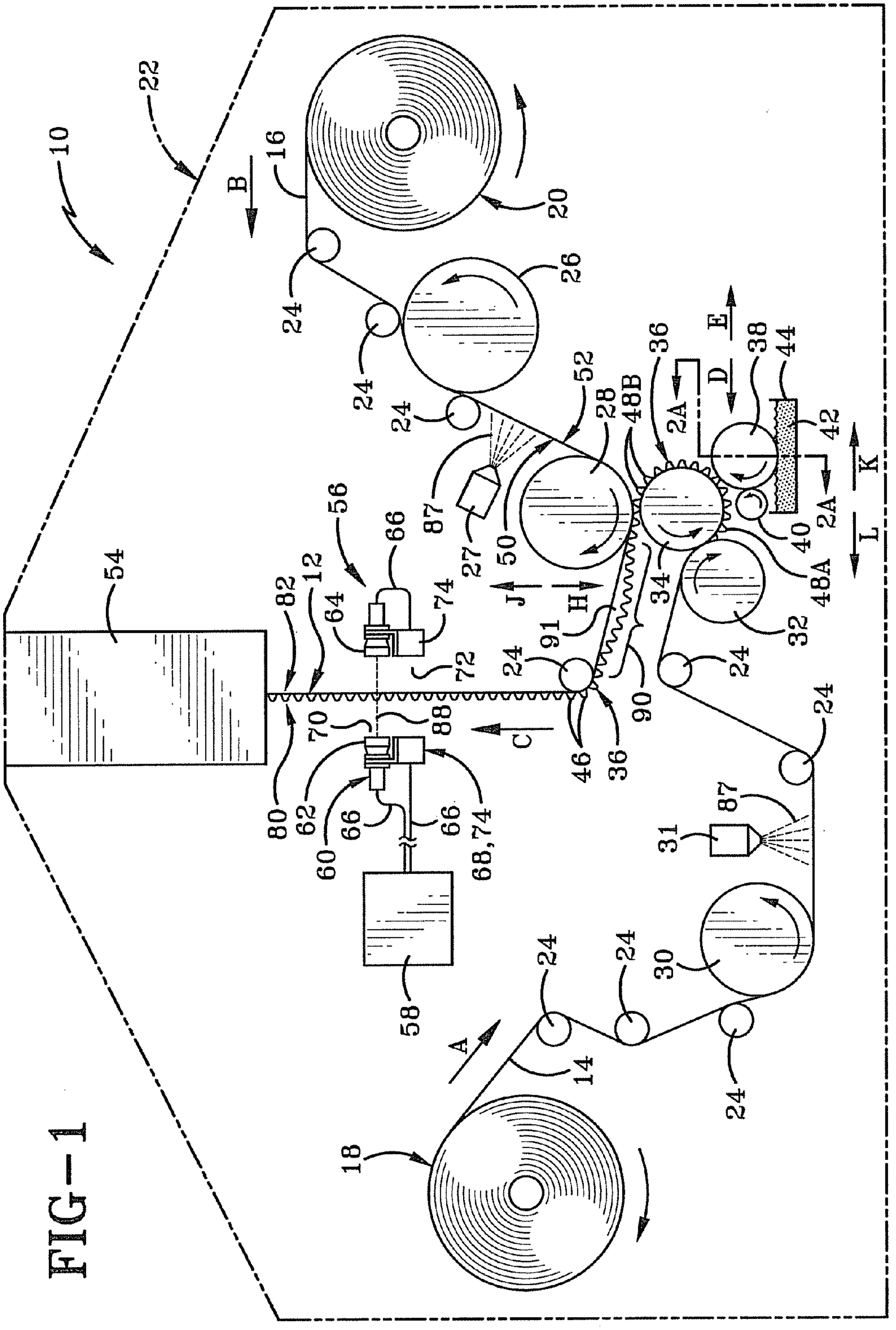
FIG. 1 is a diagrammatic view of the corrugator of the present invention as viewed from the side.

The corrugator of the present invention is shown generally at 10 in FIG. 1. Corrugator 10 is configured to form corrugated paperboard 12 from a first liner or web 14 and a second liner or web 16 which are respectively unwound from first and second wound web rolls 18 and 20 of liner or paperboard. Each of the web rolls is rotatably mounted via a spool or the like on a frame 22 of corrugator 10. Frame 22 may be a single rigid frame or may include more than one rigid frame on which various components of corrugator 10 are mounted. Frame 22 is thus shown in dashed lines to broadly represent one or more frames.

Corrugator 10 includes a paperboard conveyor system which includes a number of rotatable rolls which are rotatably mounted on the frame and on which the liners 14 and 16 and paperboard 12 are movably mounted or threaded primarily for downstream movement. These rotatable rolls include guide or tension rolls 24 around which the liners or webs 14 and 16 are threaded or partially wrapped such that the webs engage a cylindrical or circular outer perimeter of the various rolls as the webs move rapidly along the conveyor system during the formation process. Web 16 also engages and partially wraps around the outer perimeter of a first heating roll 26 which heats web 16 as it passes by and engages roll 26. A steam applicator or shower 27 is also disposed adjacent the path or pathway traveled by web 16 such that applicator 27 may apply steam to web 16 during its downstream movement and thereby alter its water or moisture content. The conveyor system further includes a pressure roll 28 which web 16 also engages and partially wraps around during travel along its pathway. Provided adjacent or along the path of web 14 are a second heating roll 30, a second steam applicator or shower 31, and first and second corrugating rolls 32 and 34. Like first heating roll 26, second heating roll 30 applies heat to web 14 as web 14 contacts and partially wraps around the cylindrical outer perimeter of roll 30 during its downstream travel. Steam applicator 31 is positioned to apply steam to web 14 to alter its water or moisture content. Corrugating rolls 32 and 34 are closely adjacent one another and include respective gear-like teeth so that when web 14 passes between corrugating rolls 32 and 34, said teeth of these rolls engage opposite sides of web 14 and press web 14 therebetween to form corrugated medium 36, which wraps around a portion of the outer perimeter of corrugating roll 34 prior to being glued to web 16.

Corrugator 10 further includes a gluing assembly with a glue applicator in the form of a glue applicator roll 38 which has an outer perimeter which is adjacent the outer perimeter of corrugating roll 34. A glue doctor roll 40 is positioned with its cylindrical outer perimeter closely adjacent the cylindrical outer perimeter of applicator roll 38. The lower portion of the outer perimeter of applicator roll 38 is in contact with and partially submersed in liquid adhesive or glue 42 which is contained within a glue pan 44. The above noted rolls rotate about respective parallel axes as indicated by the corresponding arrows shown in FIG. 1 during the downstream movement of webs 14 and 16 and corrugated paperboard 12. The downstream movement of web 14, web 16 and paperboard 12 is shown respectively at arrows A, B and C in FIG. 1.

Corrugated medium 36 includes multiple alternating ridges or flutes such that some of the flutes have flute tips 46 which are along one side of medium 36 and opposite side flute tips 48 which are along the opposite side of medium 36 and face away from the flute tips 46 which are adjacent a given set of flute tips 48. During the formation process, glue applicator roll 38 applies liquid glue to flute tips 48. Thus, FIG. 1 illustrates flute tips 48A as being unglued flute tips and flute tips 48B as being glued flute tips or flute tips to which glue has been applied by roll 38. FIG. 1 also illustrates that web 16 has first and second opposed sides 50 and 52 such that side 50 is an unglued side and side 52 becomes a glued side once the glued flute tips 48B make contact with side 52 as web or liner 16 and corrugating medium 36 move downstream between corrugating roll 34 and pressure roll 28. Although applicator roll 38 is typically stationary other than its rotational movement during operation, it can be adjusted forward (arrow D) or away from (arrow E) corrugating roll 34 and the corresponding portion of medium 36 so that the outer perimeter of applicator roll 34 is properly positioned to apply glue to flute tips 48. Thus, applicator roll 38 may be moved closer to or further away from corrugating roll 34. More particularly, the cylindrical outer perimeter of applicator roll 38 may be moved or adjusted closer to or further away from the cylindrical outer perimeter of corrugating roll 34, thus respectively decreasing or increasing the distance between said outer perimeters.

Figure 2A:
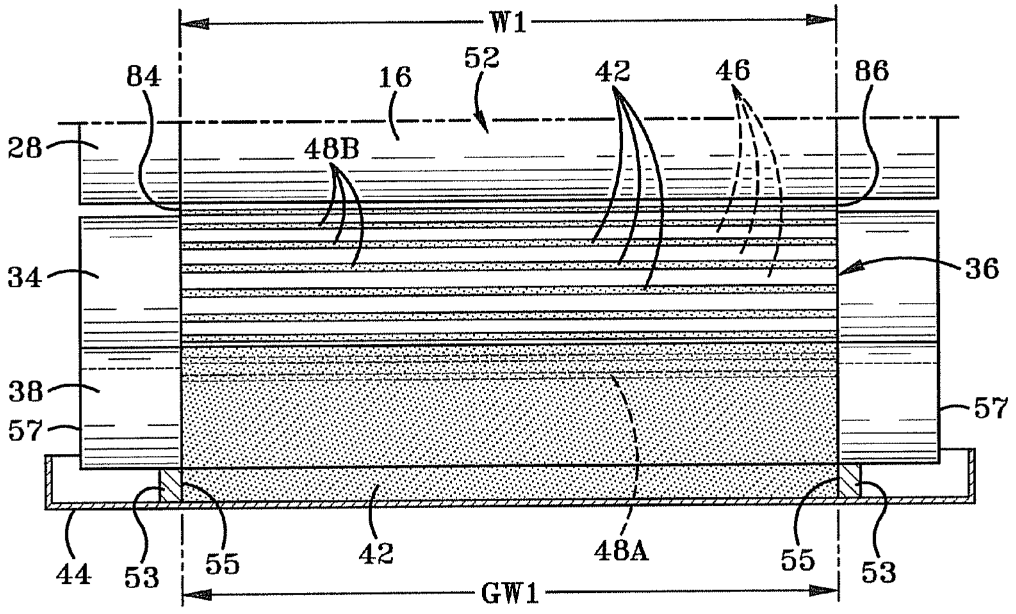
FIG. 2A is a sectional view taken on line 2A-2A of FIG. 1 showing the glue dams positioned for applying the glue at a particular width to the glue applicator roll and the corrugated medium.
Figure 2B:
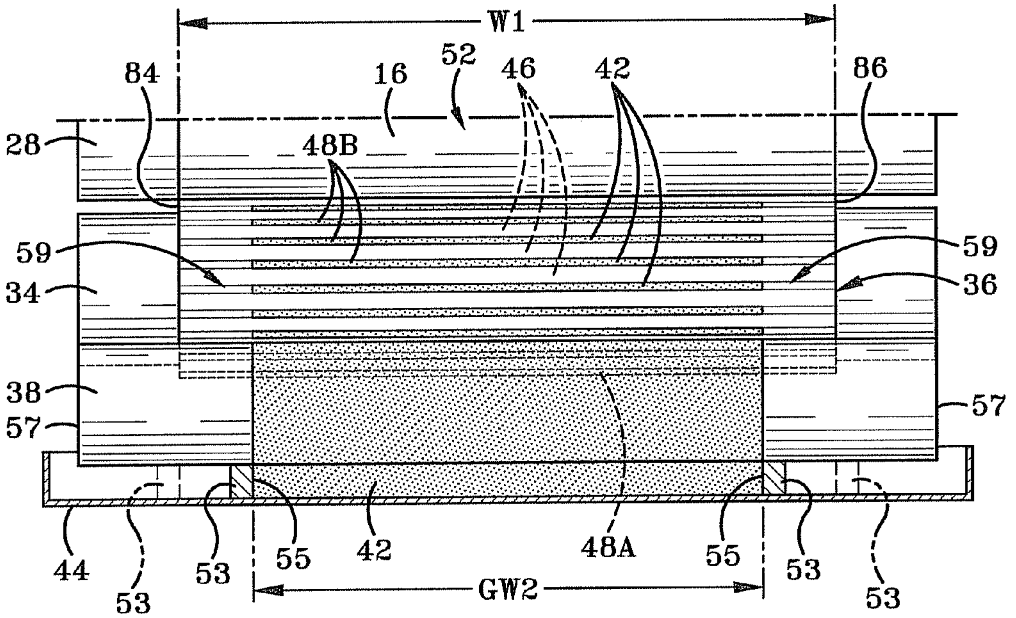
FIG. 2B is similar to FIG. 2A and shows the glue dams set at a different distance from one another to set a different width of glue applied to the glue roll applicator and corrugated medium.

With primary reference to FIGS. 2A and 2B, the gluing assembly is described in greater detail. FIGS. 2A and 2B primarily show the adjustability of glue dams 53 to adjust the width of glue applied to applicator roll 38 and subsequently to corrugating medium 36. More particularly, glue dams 53 have respective inner surfaces 55 which are generally parallel and face one another and define therebetween a width GW1 when in a given first set position. There are securing mechanisms which secure each dam 53 in a given position such as that shown in FIG. 2A. However, each dam 53 may be adjusted back and forth as shown by the arrows in FIG. 2B toward one another and away from one another in order to change the width defined between surfaces 55. FIG. 2B illustrates another position in which the dams 53 have been moved closer to one another such that surfaces 55 define therebetween a width GW2 which is less than width GW1. Dams 53 are thus adjustable toward and away from opposed ends 57 of glue applicator roll 38. Width GW1 in FIG. 2A is also the approximate axial width of glue 42 which is applied to applicator roll 38 as it contacts glue 42 within pan 44 between dams 53, and is also the approximate axial width of glue 42 which is applied to corrugated medium 36, as transferred to medium 36 from applicator roll 38. However, it will be readily appreciated that the axial width of glue 42 on roll 38 and medium 36 is typically slightly greater than width GW1 inasmuch as the liquid glue will tend to spread out somewhat, especially when pressed between the outer perimeters of applicator roll 38 and doctor roll 40. FIGS. 2A and 2B also illustrate that the paperboard has an axial width W1 defined between parallel opposed side edges 84 and 86 thereof, which is also the width of each of webs 14 and 16 and thus medium 36. FIG. 2A thus shows that width GW1 of glue 42 is sufficient to apply glue 42 to tips 48B of medium 36 from side edge 84 of medium 36 in a continuous manner to the opposed parallel side edge 86 thereof along each respective flute 48B. Thus, the axial width of glue 42 applied to medium 36 and thus between medium 36 and liner 16 as they are pressed together between rolls 28 and 34 is substantially equal to width W1. On the other hand, FIG. 2B illustrates that dams 53, having been moved closer together, apply only approximately width GW2 of glue 42 to tips 48B of medium 36, such that unglued portions 59 of tips 48B adjacent side edges 84 and 86 do not have glue applied thereto, which typically causes a separation problem between the medium and liner as discussed further below.

Once paperboard 12 in the form of the singleface web is produced, it continues to move downstream (arrow C) toward a receiving section 54 of corrugator 10, which is thus downstream of pressure roll 28, corrugator roll 34 and the various other rolls and components previously noted. Receiving section 54 broadly represents various components of corrugator 10 which are used to further manipulate corrugated paperboard 12, either to finalize the production of paperboard 12 itself as an end product or to combine paperboard 12 with other layers such as additional liners and/or another corrugated medium in order to form the more complex corrugated paperboard structures discussed in the Background section of the present application.

In accordance with the invention, corrugator 10 includes a separation sensor assembly 56 which is configured to sense a separation of corrugated medium 36 and flat liner 16 after they have been glued together to form the corrugated paperboard 12. Assembly 56 is thus downstream of the various rolls 18-40 and steam showers 27 and 31, and also upstream of receiving section 54. Assembly 56 is in electrical or other communication with a control 58, which is also in electrical or other communication with the various driving components of corrugator 10 such that control 58 is capable of controlling operation of corrugator 10, which may include turning corrugator on and off in order to respectively operate corrugator 10 or shut it down to cease operations. More particularly, control 58 is in electrical or other communication with the various drive mechanisms or systems which put all of the moving components of corrugator 10 into operation such that webs 14 and 16 unwind respectively from rolls 18 and 20 and move through the conveyor system in order to be glued and thus joined together to form corrugated paperboard 12, and to keep paperboard 12 moving downstream along the conveyor system to the downstream end of corrugator 10. Control 58 is thus also capable of shutting down corrugator 10 or causing all of its pertinent components involved in the formation of paperboard 12 to cease operation. Control 58 typically controls the operation of the various drive systems of corrugator 10 in a manner to increase or decrease the rate of speed with which each component moves to increase or decrease the rate at which liners 14, 16 and paperboard 12 move downstream.

Figure 3:
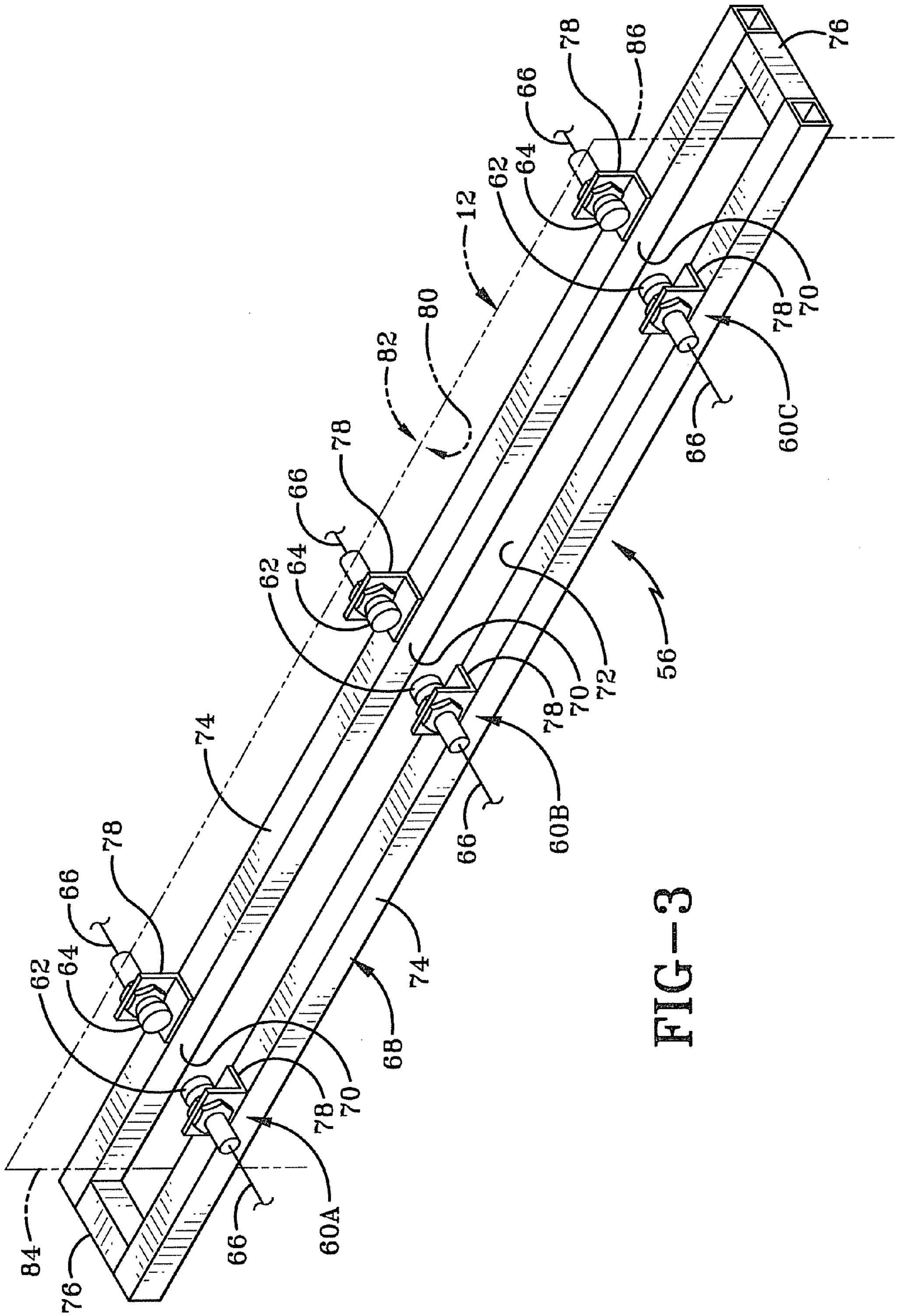
FIG. 3 is a perspective view of the separation sensor assembly of the present invention with corrugated paperboard shown in dot-dash lines.

With reference to FIGS. 1 and 3, sensor assembly 56 is now described in greater detail. Assembly 56 includes a plurality of separation sensor 60A-C, each including a sensor sending unit 62 and a sensor receiving unit 64. In the exemplary embodiment, each sensor 60 is an ultrasonic sensor which produces ultrasonic sound waves which may be used to determine the density of paperboard 12 as well as the change of density in paperboard 12 as it moves past the respective sensor 60. Each of units 62 and 64 is in electrical or other communication with control 58, such as by electrically conductive wires 66, whereby signals from sensor 60 may be communicated to control 58. Assembly 56 includes a rigid sensor assembly frame 68 on which sensor 60 are mounted. The respective units 62 and 64 of each sensor 60 define therebetween a space or passage 70 for receiving there through paperboard 12. Frame 68 defines a rectangular passage 72 for receiving there through paperboard 12. More particularly, frame 68 includes a pair of rigid parallel long side bars 74 and a pair of rigid short end bars 76 which are parallel to one another and perpendicular to long bars 74. End bars 76 extend between and are rigidly secured to the respective opposed ends of side bars 74 whereby side bars 74 and end bars 76 define therebetween passage 72. Each of units 62 and 64 is respectively secured to one of side bars 74 by a respective mounting bracket 78.

With reference to FIG. 3, corrugated paperboard 12 (shown in dot-dashed lines) has first and second opposed and generally flat sides 80 and 82 which face away from one another and define therebetween a thickness of paperboard 12. As previously noted, first and second side edges 84 and 86, which face away from one another, define therebetween axial width W1 (FIGS. 2A, 2B) of paperboard 12. Side edges 84 and 86 also define therebetween an axial direction of paperboard 12. The axial direction or width of paperboard 12 is thus generally perpendicular to the direction in which a given portion of paperboard 12 is moving downstream during operation of corrugator 10. As shown in FIG. 3, sensors 60A-C are axially spaced from one another with sensor 60A generally adjacent side edge 84 of paperboard 12 and one of end bars 76, sensor 60C generally adjacent the opposed side edge 86 and opposed end bar 76, and sensor 60B approximately midway between the opposed side edges 84 and 86 and approximately midway between end bars 76. Although the exemplary embodiment shows three sensors 60, more separation sensors may be used if desired, especially if the paperboard at issue is wide enough to justify additional sensors. On the other hand, one or two of such sensors may be used, especially for relatively narrower corrugated paperboard. However, it is typically preferred to have sensors respectively adjacent the opposed side edges of the paperboard to sense separation of the corrugated medium 36 from liner 16 in these areas. It is also typically desirable to have a sensor such as 60B generally midway between or somewhere intermediate the opposed side edges. FIG. 3 illustrates that side edges 84 and 86 are generally adjacent end bars 76 respectively. In addition, FIGS. 1 and 3 illustrate that side 84 of paperboard 12 faces, is adjacent and spaced from sending unit 62 of each of sensor 60, and that the opposed side 86 faces, is adjacent and spaced from the receiving units 64 of each of sensor 60. Sending units 62 and sending unit 64 are thus on opposite sides of paperboard 12 when paperboard 12 is within passages 70 and 72.

The operation of corrugator 10 is now described. When corrugator 10, which is typically electrically powered, is running, the conveyor system thereof drives the movement of webs 14 and 16 and the newly formed corrugated paperboard 12 in a downstream direction as previously discussed. More particularly, web 14 unwinds from the rotating wound roll 18 and is threaded around the various rolls 24, heat roll 30, and also around corrugating roll 34 whereby the corrugated medium 36 is newly formed as it passes between corrugating rolls 32 and 34. As previously discussed, heating roll 30 heats web 14 as it engages and moves past the outer perimeter of rotating heating roll 30. In addition, steam applicator 31 is typically operated to produced steam 87 in order to apply steam to web 14 as it moves past applicator 31 to increase the moisture content of web 14. Applicator roll 38 rotates with its outer perimeter engaging and picking up glue 42 from within pan 44 to transfer glue 42 to medium 36. The outer perimeter of doctor roll 40 limits the amount or thickness of glue extending radially outwardly from the outer perimeter of applicator roll 38. Applicator roll 38 rotates as the newly formed corrugated medium 36 revolves around corrugating roll 34 so that glue is transferred from roll 38 to medium 36 and more particularly is applied to tips 48 of the flutes to provide the glued fluted tips 48B immediately downstream of applicator roll 38.

Meanwhile, web 16 unwinds from the wound roll 20 and moves along the conveyor system threaded around the various rolls 24, heater roll 26 and pressure roll 28. As previously noted, heating roll 26 heats web 16 as it engages and passes around the outer perimeter of rotating heating roll 26. Steam shower 27 may also produce steam 87 which is applied to web 16. Web 16, along with corrugating medium 36 having glued tips 48B, passes between corrugating roll 34 and pressure roll 28, which rotates and presses on side 50 of web or liner 16 in order to force or press side 52 of liner 16 into engagement with the glued tips 48B whereby the corrugated medium 36 and liner 16 are glued to one another to form corrugated paperboard 12 (block 105 in FIG. 7). Pressure wheel 28 is configured for adjustment toward (arrow H in FIG. 1) and away from (arrow J in FIG. 1) corrugating wheel 34 and thus the portions of liner 16 and medium 36 therebetween. Arrows H and J also respectively represent increased and decreased pressure applied by pressure roll 28 directly on liner 16 and indirectly on medium 36 and corrugating roll 34. Ideally, corrugated medium 36 and liner 16 are properly glued to one another and continue along their downstream path to receiving section 54 for additional processing. However, if medium 36 and liner 16 are not properly glued together for one reason or another, they may separate from one another, as illustrated by faulty segment 90. In FIG. 1, faulty segment 90 is illustrated just downstream of corrugating roll 34 and pressure roll 28.

Throughout the operation of corrugator 10, sensor assembly 56 is operated whereby each sending unit 62 produces an ultrasonic sensing wave 88 (dashed lines) which is transmitted to receiving unit 64 through paperboard 12. As previously noted, separation sensors 60 are ultrasonic sensors which are capable of sensing the density of paperboard 12 as it is passing downstream between the corresponding units 62 and 64 within passage 70. Thus, sensor 60A senses the density of paperboard 12 generally adjacent side edge 84 while sensor 60B senses the density of paperboard 12 generally midway between edges 84 and 86, and sensor 60C senses the density of paperboard 12 generally adjacent side edge 86. Each of sensors 60 is thus continuously sending signals corresponding to the density of paperboard 12 at any given moment to control 58, which includes a computer or appropriate logic circuits to determine the density, compare it to a predetermined value or value range, and thus evaluate whether the given density is at the value or within the value range. If the determined density is within the value range, control 58 will continue to operate corrugator 10 to continue producing additional paperboard 12.

Figure 4:
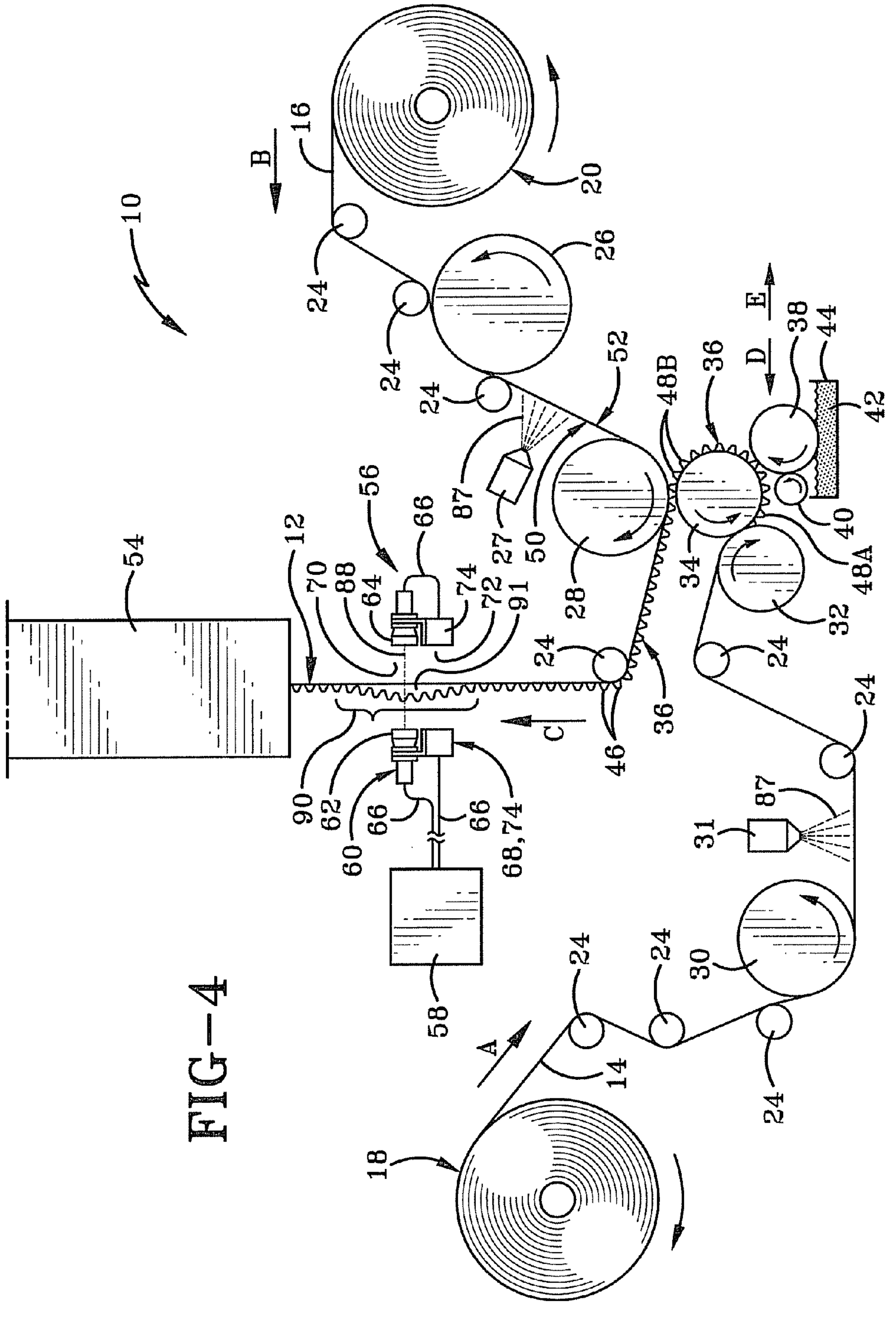
FIG. 4 is similar to FIG. 1 and shows the sensor assembly sensing the separation of the corrugating medium from the liner.

However, the measured density value is not always within the value range, which is the case illustrated by FIG. 4. More particularly, FIG. 4 shows faulty section 90 passing by sensors 60, and more particularly between the sending and receiving units thereof within space 72, such that at least one of sensors 60 via the corresponding ultrasonic wave 88 has measured a density which control 58 has determined is outside the density value range. This variation in the density of paperboard 12 within the faulty segment 90 is caused by the separation of medium 36 and liner 16, such that liner 16 and tips 48B of medium 36 define therebetween a gap 91, which may easily reach ⅛ inch, ¼ inch or ½ inch depending on the specific circumstances. Thus, one or more of sensors 60 effectively senses the separation of these two layers from one another (block 106 in FIG. 7). Control 58, having determined that the density of at least a portion of faulty segment 90 is outside the value range, typically automatically and immediately turns pertinent drive systems of corrugator 10 off or otherwise controls corrugator 10 in order to cease the downstream movement of webs 14, 16 and paperboard 12 as rapidly as is feasible (block 107 in FIG. 7).

Figure 5:
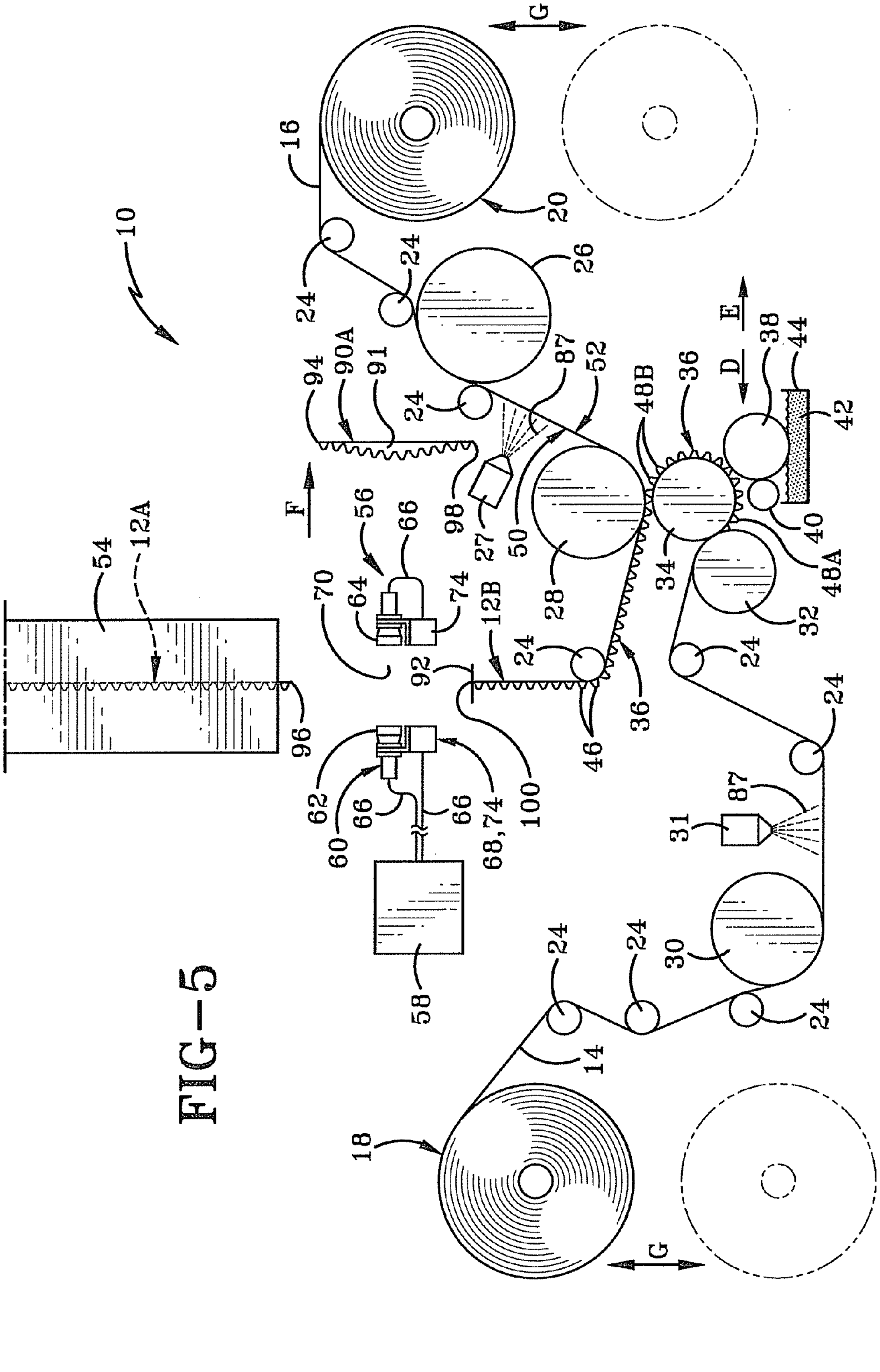
FIG. 5 is similar to FIG. 4 and shows the removal of a faulty section of the paperboard which was determined to have a separation between the corrugated medium and liner.
Figure 6:
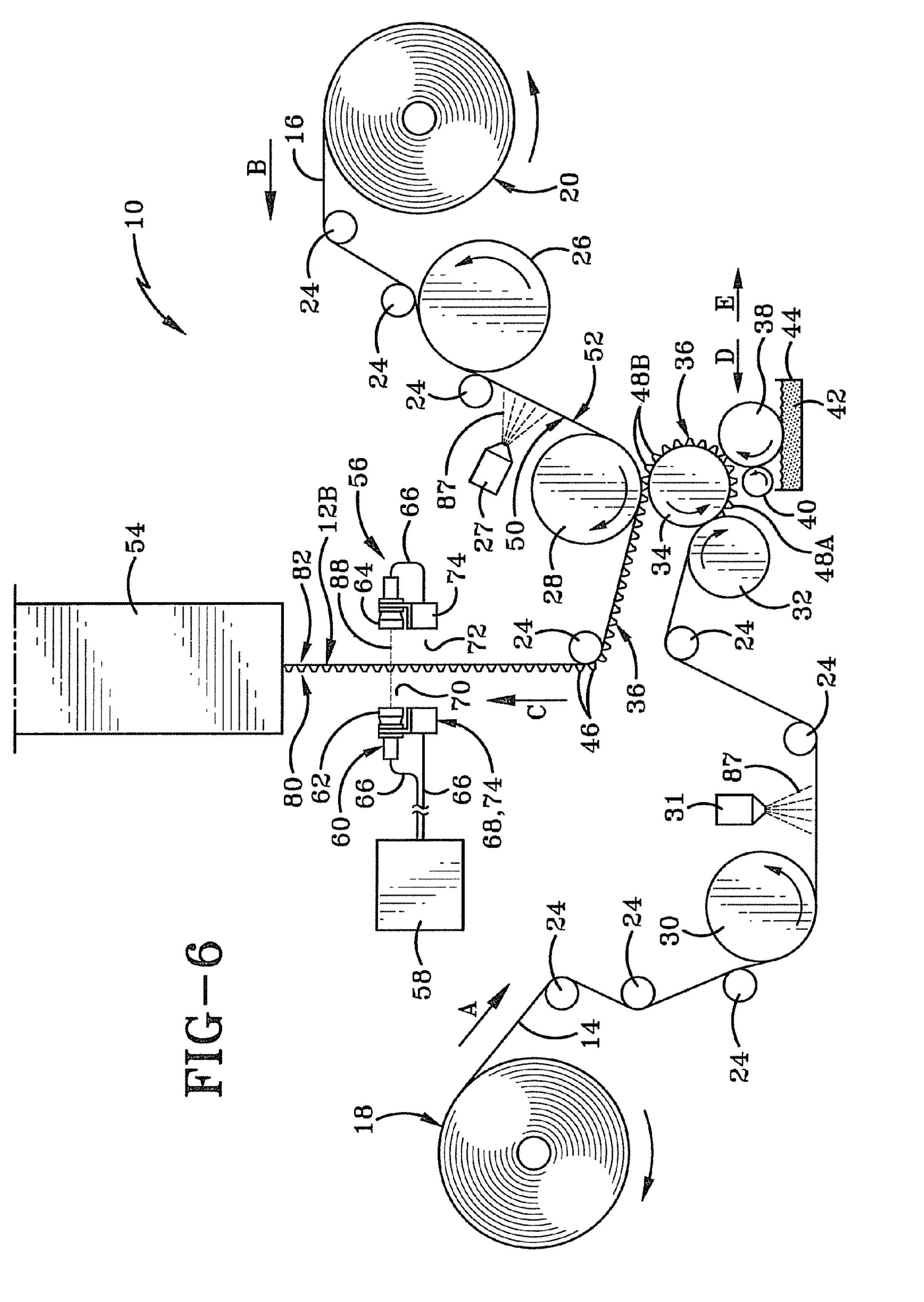
FIG. 6 is similar to FIG. 5 and illustrates the subsequent operation of forming the paperboard after the removal of the faulty segment thereof.
Figure 7:
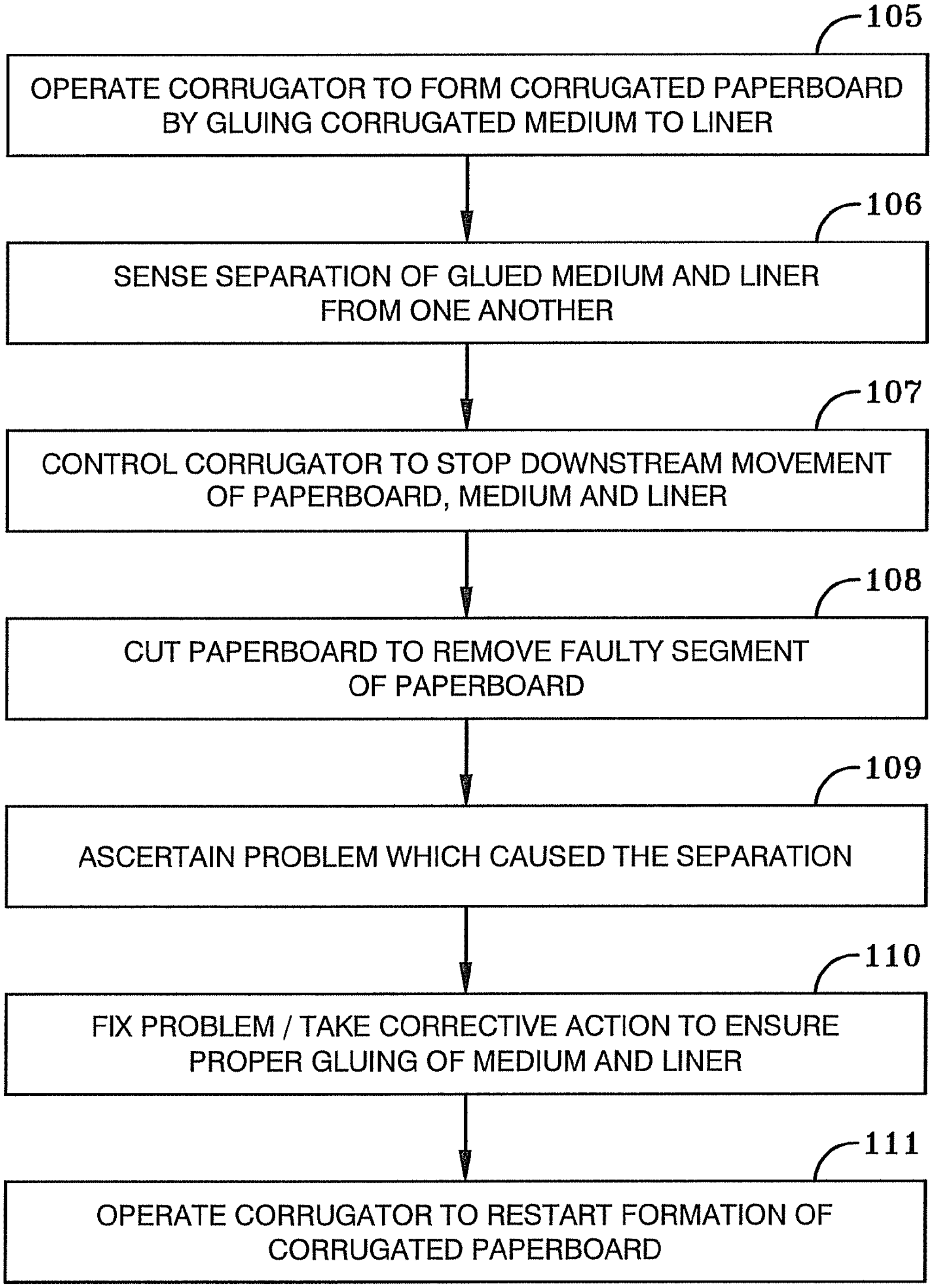
FIG. 7 is a flow chart showing the basic method of the present invention.

Then, as illustrated at block 108 in FIG. 7 and in FIG. 5, the faulty segment is removed (arrow F) whereby the removed faulty segment is marked as 90A. More particularly, corrugated paperboard 12 is cut from side edge 84 to side edge 86 upstream and downstream of faulty segment 90 such that the faulty segment is completely separated from the remaining downstream section 12A of the corrugated paperboard and the remaining upstream section 12B of the corrugated paperboard. This cutting of paperboard 12, with a cutter 92, results in the removed faulty segment 90A with a leading edge 94 which was cut and separated from the trailing edge 96 of downstream segment 12A, and faulty segment 90A having a trailing edge 98 which was cut and separated from the leading edge 100 of upstream segment 12B. It is noted that FIG. 5 is a diagrammatic representation, and thus shows faulty segment 90A removed in the vicinity of the separation sensor assembly. However, it is more likely that the removal would be somewhat downstream of the sensor assembly due to the distance that the corrugated paperboard will typically have traveled from the time that the separation is sensed to the time that the downstream movement of the paperboard can be stopped since the paperboard is moving at relatively rapid rates as discussed in the Background section of the present application.

A worker will inspect the faulty section and typically various components of corrugator 10 and/or webs 14 and 16 to ascertain one or more problems which caused the separation of corrugating medium 36 from liner 16. Once the problem has been ascertained (block 109), the problem is fixed, or corrective action is taken to ensure the proper gluing of the medium and liner (block 110). Some of the problems and corrective actions are noted below.

The problem could be related to the paper, the glue or certain aspects of corrugator 10 itself. One of the problems may be that one or both of the rolls 18 or 20 do not have the proper water or moisture content, which is typically about 5% to 8%. Although moisture content of the paperboard in these rolls may be higher than desired, problems with proper gluing more often occur when the moisture content is too low. In the scenario where the paperboard is too moist, a corrective action may involve increasing the temperature of the corresponding heating roll 26 or 30 in order to increase the temperature of the corresponding web to help dry the paper out, reducing the rate at which the webs 14, 16 and paperboard 12 move downstream to provide greater duration of contact with the heating rolls, or reducing the rate at which steam 87 is applied from one of showers 27 or 31 or even stopping steam application if steam is being used. On the other hand, if the moisture content of the paperboard is too low (too dry), the most common solution would be to increase the rate of steam 87 being applied to one or both of webs 14 and 16 although the temperature of the heating rolls may also be reduced and the rate of travel of the webs and paperboard may be increased as well. If the paperboard on one of rolls 18 and 20 does not have the proper moisture content and cannot be fixed by the above-noted procedures, the corresponding roll may have to be removed and replaced as indicated at arrows G in FIG. 5, in order to provide a roll of paperboard with a moisture content which is within the proper range, or which can be suitably adjusted by the previously noted methods.

In addition to the moisture content needing to be within a certain range, the webs 14 and 16 should be at a suitable temperature to facilitate the proper formation of corrugated medium 36 and the gluing of medium 36 and liner 16 to one another. Controlling the temperature of webs 14 and 16 is primarily related to the use of heating rolls 26 and 30 although the use of steam showers 27 and 31 also has an effect on the temperature of the webs. Thus, if the webs are not within a suitable temperature range, the temperature of heating rolls 26 and 30 may be increased or decreased to respectively increase or decrease the temperature of webs 16 and 14 as a result of contact with the heating rolls. As also noted above, the rate at which webs 14 and 16 move downstream and thus are in contact with heating rolls 26 and 30 corresponds to the temperature of webs 14 and 16 downstream of heating rolls 26 and 30. Thus, the rate of downstream movement of the webs may also be increased or decreased to adjust the temperature of the webs. In addition, the rate at which heating rolls 26 and 30 are rotated may contribute to the problem of properly heating the webs 16 and 14, especially if the gearbox and/or motor driving the given heating roll has become defective to the degree that the heating roll is no longer being driven by the motor and/or gearbox, but only driven by the movement of the corresponding web 14 or 16 along the outer perimeter of the given heating roll. Thus, the rate of rotation of the heating rolls may need to be adjusted, or the gearbox and/or drive motor associated with the given heating roll may need to be adjusted or repaired if broken. As noted above, steam showers 27 and 31 may be controlled to not only adjust the moisture content of webs 14 and 16 but also to adjust the temperature thereof, with an increase in the amount or rate of steam being associated with increasing the temperature of the webs and a decrease being associated with reducing the temperature of the webs.

As noted above, one of the problems which may arise with the proper gluing of the layers forming the corrugated paperboard 12 involves the glue 42 itself. The proper formulation and particularly the viscosity of glue 42 is typically held within a certain range in order to ensure that the proper amount of glue with the proper characteristics is applied to liner 36. With modern corrugators, the viscosity and formulation of the glue is typically well controlled and usually does not present a problem. For instance, corrugators are often set to test the viscosity of the glue every 10 minutes or so in order to ensure it is within the proper range. Furthermore, corrugators are typically automated to produce new batches of glue at regular and relatively short intervals, for instance every two hours although this may vary.

Application of an improper amount of glue between the medium and liner is a fairly common problem which may cause the separation of the medium and liner. The two primary dimensions at issue with application of a proper amount of glue are the thickness of the glue and the axial width of the glue. The thickness of the glue is the distance which glue 42 extends outwardly from tips 48B after applied thereto by applicator roll 38. The axial width of the glue applied is that previously discussed with respect to FIGS. 2A and 2B, and thus relates to the axial direction of paperboard 12. The correct viscosity and formulation of glue 42 plays a role in whether the applied thickness is proper. In addition, whether the proper thickness of glue is applied to tips 48, or whether glue is applied to tips 48 at all, is impacted by the distance between the outer perimeter of applicator roll 38 and tips 48 and the outer perimeter of roll 34. As discussed above, applicator roll 38 may be moved toward and away from roll 34 and tips 48 of the portion of medium 36 adjacent roll 38, as illustrated by arrows D and E in FIG. 1. Thus, the thickness of glue applied to tips 48 may be increased or decreased respectively by moving applicator roll 38 closer to or further from said tips 48 and roll 34, thus also respectively decreasing and increasing the distance between roll 38 and tips 48B, and between roll 38 and roll 34.

In addition, the thickness of glue applied to tips 48 is controlled by the use of doctor roll 40 or another doctor device such as a non-rolling doctor blade, which is adjacent applicator roll 38. Roll 38 typically picks up excess glue 42 as roll 38 passes through the glue 42 within pan 44. The doctor device controls and in particular limits the amount and thickness of glue 42 which passes between the doctor device and roll 38 and remains on the outer perimeter of applicator roll 38 as the outer perimeter of roll 38 rotates past the doctor device such as doctor roll 40. Thus, the distance between the doctor device and the applicator roll 38 may be used to adjust the thickness of glue 42 which is transferred to tips 48. More particularly, doctor roll 40 may be moved closer to and further away from doctor roll 38, as respectively indicated at arrows K and L in FIG. 1, which thus also respectively represent decreasing and increasing the distance between the outer perimeters of rolls 38 and 40.

As previously noted, the axial width of the glue 42 which is applied to medium 36 may also be one of the problems which causes separation of the medium and liner. For example, FIG. 2B illustrates approximately a width GW2 which is applied to medium 36, which itself has a width W1 which is substantially larger than width W2. Thus, the portions 59 of medium 36 adjacent its opposed edges 84 and 86 do not have glue applied thereto and thus are not properly glued to liner 16 after passing between corrugating roll 34 and pressure roll 28. Such a lack of glue in these regions typically causes a separation problem which is sensed by the separation sensor assembly. Thus, if the width of glue applied between the medium and liner is incorrect, dams 53 may be adjusted in order to correct this problem and apply the proper width of glue to ensure proper gluing of the medium and liner.

Another reason that an incorrect amount of glue may be applied between the medium and liner is related to the rate at which webs 14 and 16 and paperboard 12 move downstream. A downstream movement rate which is too high may cause the application of the glue to be too thin or insufficient whereby a separation is created. A problem could also be caused by this rate being too slow. Thus, a change in this rate may fix the problem of improper gluing. Reducing the downstream rate of the webs and corrugated paperboard if too high may allow sufficient glue to be transferred from applicator roll 38 to corrugated medium 36. Increasing this downstream rate if too low may also fix the problem.

Regardless of what the problem is, once it is fixed, the corrugator may be operated again to restart formation of the corrugated paperboard (block 111 in FIG. 7). More particularly, the downstream movement of the remaining portions of paperboard is restarted to begin forming additional corrugated paperboard 12 from webs 14 and 16. Thus, the downstream remaining portion 12A shown in FIG. 5 moves downstream through the receiving section 54 to the end of machine 10 and may undergo additional processing. Likewise, the remaining upstream portion 12B is further threaded along corrugator 10 so that it too may move downstream during the subsequent formation of additional corrugated paperboard.

The present invention thus provides a separation sensor assembly which may be used with a corrugator in order to determine when separation of corrugating medium from a liner occurs. The ability to assess this separation thus allows the faulty segment of paperboard to be removed in order to prevent subsequent problems which would otherwise occur if the faulty segment continued downstream travel through the corrugator. The present invention thus prevents damage and substantially time consuming repairs which might occur if such a faulty segment were to move downstream into certain sections of the corrugator.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method comprising the steps of:

gluing a corrugated medium to a liner as the medium and liner are moving downstream through a corrugator to form a corrugated paperboard; wherein the corrugated medium has opposed side edges and the liner has opposed side edges; and the corrugated paperboard has opposed first and second flat sides which face away from one another and define therebetween a thickness of the corrugated paperboard; and sensing with at least one ultrasonic separation sensor a separation of the glued medium and liner from one another; wherein the at least one ultrasonic separation sensor is intermediate the side edges of the corrugated medium and intermediate the side edges of the liner throughout the downstream movement of the corrugated medium and liner; and the at least one ultrasonic separation sensor comprises a sending unit and a receiving unit which are on opposite sides of the corrugated paperboard whereby the first flat side of the corrugated paperboard faces the sending unit and the second flat side of the corrugated paperboard faces the receiving unit so that the corrugated medium and liner pass directly between the sending unit and receiving unit throughout downstream movement of the corrugated paperboard through the corrugator; and wherein the step of sensing comprises producing ultrasonic sensing waves with the sending unit and transmitting the ultrasonic sensing waves to the receiving unit through the corrugated paperboard so that the ultrasonic sensing waves pass through the corrugated medium and liner throughout downstream movement of the corrugated paperboard through the corrugator.

2. The method of claim 1 wherein the step of sensing comprises the step of sensing a density of the corrugated paperboard with the at least one ultrasonic separation sensor.

3. The method of claim 1 further comprising the step of stopping downstream movement of the corrugated paperboard in response to the step of sensing.

4. The method of claim 3 wherein the separation of the glued medium and liner from one another produces a separated medium and liner; and further comprising the step of removing a faulty segment of the corrugated paperboard which comprises the separated medium and liner from a remaining portion of the corrugated paperboard.

5. The method of claim 1 wherein the separation of the glued medium and liner from one another produces a separated medium and liner; and further comprising the step of removing a faulty segment of the corrugated paperboard which comprises the separated medium and liner from a remaining portion of the corrugated paperboard.

6. The method of claim 5 wherein the step of removing comprises the step of cutting the corrugated paperboard.

7. The method of claim 5 further comprising the step of moving the remaining portion of the corrugated paperboard downstream through the corrugator.

8. The method of claim 1 further comprising the step of controlling operation of the corrugator with a control in response to the step of sensing.

9. The method of claim 1 further comprising the step of ascertaining a problem which caused the separation; and fixing the problem.

10. The method of claim 9 wherein the step of fixing comprises the step of adjusting an amount of glue applied between the corrugated medium and liner.

11. The method of claim 9 wherein the step of fixing comprises the step of adjusting a rate at which the paperboard moves downstream.

12. The method of claim 9 wherein the step of fixing comprises the step of adjusting moisture content of one of the medium and liner.

13. The method of claim 9 wherein the step of fixing comprises the step of adjusting a temperature of one of the medium and liner.

14. The method of claim 9 wherein the step of fixing comprises the step of adjusting a pressure applied by a pressure roll to one of the medium and liner toward the other of the medium and liner.

15. The method of claim 9 wherein the step of fixing comprises the step of replacing a roll of paperboard from which one of the corrugated medium and liner was unwound with another roll of paperboard.

16. The method of claim 1 wherein the at least one ultrasonic separation sensor comprises a first ultrasonic separation sensor which is approximately midway between the side edges of the corrugated paperboard.

17. The method of claim 16 wherein the at least one ultrasonic separation sensor comprises a second ultrasonic separation sensor which is adjacent one of the side edges of the corrugated paperboard.

18. The method of claim 17 wherein the at least one ultrasonic separation sensor comprises a third ultrasonic separation sensor which is adjacent the other of the side edges of the corrugated paperboard.

* * * * *